US010963690B2

(12) United States Patent
Qin et al.

(10) Patent No.: US 10,963,690 B2
(45) Date of Patent: Mar. 30, 2021

(54) METHOD FOR IDENTIFYING MAIN PICTURE IN WEB PAGE (71) Applicant: BAIDU ONLINE NETWORK TECHNOLOGY (BEIJING) CO., LTD., Beijing (CN)

(72) Inventors: Shouke Qin, Beijing (CN); You Han, Beijing (CN); Peizhi Xu, Beijing (CN); Xuezhong Qiu, Beijing (CN); Xiaolin Ma, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 58 days.

(21) Appl. No.: 16/474,842

(22) PCT Filed: May 9, 2017

(86) PCT No.: PCT/CN2017/083544
§ 371 (c)(1),
(2) Date: Jun. 28, 2019

(87) PCT Pub. No.: WO2018/120575
PCT Pub. Date: Jul. 5, 2018

(65) Prior Publication Data
US 2019/0332859 A1  Oct. 31, 2019

(30) Foreign Application Priority Data
Dec. 30, 2016  (CN) .......................... 201611259514.4

(51) Int. Cl.
*G06K 9/00* (2006.01)
*G06F 16/958* (2019.01)
(Continued)

(52) U.S. Cl.
CPC ......... *G06K 9/00456* (2013.01); *G06F 16/51* (2019.01); *G06F 16/538* (2019.01);
(Continued)

(58) Field of Classification Search
CPC ............. G06K 9/00456; G06F 16/958; G06F 16/538; G06F 16/51; G06F 16/5866; G06N 3/08; G06T 3/40
(Continued)

(56) References Cited

U.S. PATENT DOCUMENTS 10,339,375 B2 * 7/2019 Castillo ................. G06F 40/295
2008/0288476 A1 * 11/2008 Kim ........................ G06Q 10/10
(Continued)

FOREIGN PATENT DOCUMENTS

CN  104063489 A  9/2014
CN  104123363 A  10/2014
(Continued)

OTHER PUBLICATIONS

Fang, Chen, et al. "Automatic image cropping using visual composition, boundary simplicity and content preservation models." Proceedings of the 22nd ACM international conference on Multimedia. 2014. (Year: 2014).*
(Continued)

Primary Examiner — Jonathan S Lee
(74) Attorney, Agent, or Firm — Lathrop GPM LLP (57) ABSTRACT A method and device for identifying a main picture in a web page. The method comprises: picking out candidate main pictures based on a page attributes of each picture in a web page (210); cropping an original picture of each candidate main picture to obtain a corresponding picture composition (220); determining a candidate main picture having an information topic matching a topic of the web page (230); and identifying a picture composition corresponding to the
(Continued)

matched candidate main picture as the main picture of the web page (240).

13 Claims, 3 Drawing Sheets

(51) Int. Cl.
    *G06F 16/538*      (2019.01)
    *G06F 16/51*      (2019.01)
    *G06F 16/58*      (2019.01)
    *G06N 3/08*      (2006.01)
    *G06T 3/40*      (2006.01)

(52) U.S. Cl.
    CPC ........ *G06F 16/5866* (2019.01); *G06F 16/958* (2019.01); *G06N 3/08* (2013.01); *G06T 3/40* (2013.01)

(58) Field of Classification Search
    USPC ......................................................... 382/155
    See application file for complete search history.

(56) References Cited

U.S. PATENT DOCUMENTS

| 2010/0073398 A1 | 3/2010 | Fisher et al. |
| 2014/0244405 A1 | 8/2014 | Cohen et al. |

FOREIGN PATENT DOCUMENTS

| JP | 2004534334 A | 11/2004 |
| JP | 2004537901 A | 12/2004 |
| JP | 2011238019 A | 11/2011 |
| JP | 2012093863 A | 5/2012 |
| JP | 2015535114 A | 12/2015 |
| JP | 2016500180 A | 1/2016 |

OTHER PUBLICATIONS

PCT/CN2017/083544 English translation of International Search Report dated Sep. 28, 2017, 2 pages.
European Patent Application No. 17888273.4 extended Search and Opinion dated Sep. 28, 2020, 8 pages.
Japanese Patent Applicant No. 2019552321 Office Action dated Jul. 14, 2020, 4 pages.
Japanese Patent Applicant No. 2019552321 English translation of Office Action dated Jul. 14, 2020, 4 pages.

* cited by examiner

METHOD FOR IDENTIFYING MAIN PICTURE IN WEB PAGE

RELATED APPLICATIONS

This application is a US National phase of International Application No. PCT/CN2017/083544, filed on May 9, 2017, which is based on and claims priority of Chinese Patent Application No. 201611259514.4, filed on Dec. 30, 2016, the entire contents of which are incorporated herein by reference.

FIELD

The present disclosure relates to Internet technology field, and more particularly, to a method for identifying a main picture in a web page and a computing device.

BACKGROUND

With the development of internet technology, there are more and more web pages with pictures and texts. In business promotion, pictures on a web page can directly convey the contained content to users; in addition, compared with displaying with text, displaying with the picture in a web page can provide more information, which is more conducive to netizens' intuitive and rapid selection of the content of interest. In particularly, the quality and information of a main picture is significantly higher than other pictures in a web page, which can best reflect the topic of the web page. Therefore, in practical applications, in order to improve the click-through rate of business promotion, picture material in an advertisement can be fully excavated, and the main picture that highlights the topic of a web page can be displayed in business promotion.

At present, there is a main picture recognition solution which can capture a key picture in a web page in the related art: obtaining a DOM (Document Object Model) structure of a web page based on a web address; locating a center node of the web page based on the DOM structure of the web page; performing a regular matching on pictures at the center node and its siblings, performing a format filtering and an attribute filtering on the regular matched pictures (selecting a picture with a specified height and width); outputting the picture that meets filtering conditions; and using the outputted picture as the key picture of the web page.

However, the inventor of the present disclosure has discovered that the main picture captured by the main picture recognition solution cannot accurately express the topic of a web page, thus resulting in a low transmission efficiency of web page information.

SUMMARY

In view of the above defects or deficiencies in the related art, it is expected to provide a solution for digging out a main picture that effectively highlights a topic of a web page, so as to improve a transmission efficiency of web page information and improve user experience.

In a first aspect, embodiments of the present disclosure provide a method for identifying a main picture of a web page, including: picking out candidate main pictures based on a page attribute of each picture in the web page; cropping an original picture of each candidate main picture based on an information topic of the candidate main picture to obtain a corresponding picture composition; determining a candidate main picture having an information topic matching a topic of the web page; and identifying a picture composition corresponding to the matched candidate main picture as the main picture of the web page.

In a second aspect, embodiments of the present disclosure further provide a device for identifying the main picture of a web page, including: an attribute filtering unit, configured to pick out candidate main pictures based on a page attribute of each picture in the web page; a picture composition cropping unit, configured to crop an original picture of each candidate main picture based on an information topic of the candidate main picture to obtain a corresponding picture composition; a topic matching unit, configured to determine a candidate main picture having an information topic matching a topic of the web page; and a main picture identifying unit, configured to identify a picture composition corresponding to the matched candidate main picture as the main picture of the web page.

In a third aspect, embodiments of the present disclosure further provide a computing device, including one or more processors and a memory, the memory is configured to store computer instructions that, when executed by a processor, cause the processor to implement the method for identifying a main picture of a web page provided by the embodiments of the present disclosure.

With the solution for identifying the main picture of the web page provided by embodiments of the present disclosure, after picking out candidate main pictures according to page attributes, by cropping an original picture of the candidate main picture to obtain the picture composition which can highlight the information topic and identifying a picture composition having an information topic matching the topic of the web page as the main picture of the web page, not only the topic of the web page can be expressed, but also the topic of the web page can be effectively highlighted and the transmission efficiency of web page information can be improved. Furthermore, by filtering the candidate main picture based on the picture type, the high quality requirement of the final main picture of the web page can be ensured.

BRIEF DESCRIPTION OF THE DRAWINGS

These and other aspects, objectives and advantages of embodiments of the present disclosure will become more apparent from the following detailed descriptions of non-restrictive embodiments made with reference to the accompanying drawings, in which.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

It should be noted that, without conflict, the embodiments and features in the embodiments of the present disclosure may be combined with each other. The present disclosure will be described in detail below with reference to the accompanying drawings and the embodiments.

Figure 1:
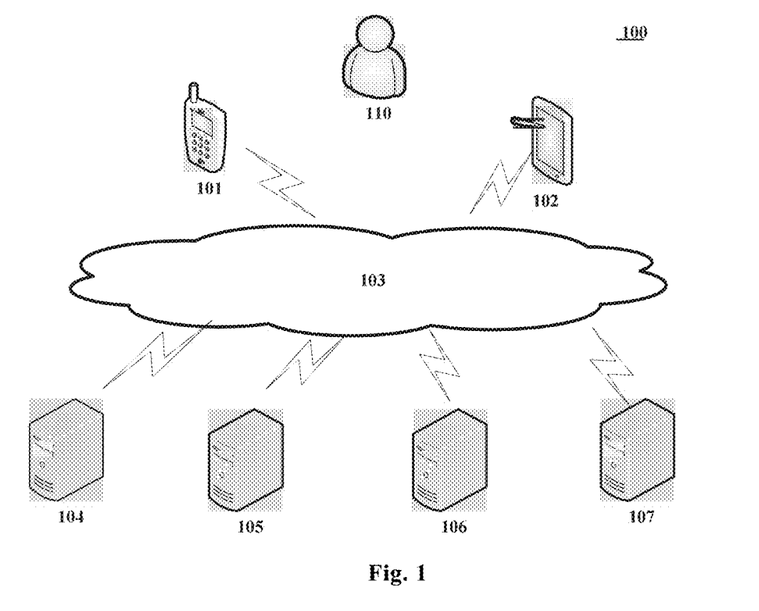
FIG. 1 is an exemplary system architecture applicable to embodiments of the present disclosure.

FIG. 1 shows an exemplary system architecture 100 that can be applied to embodiments of the present disclosure.

As shown in FIG. 1, the system architecture 100 can include terminal devices 101, 102, a network 103, and servers 104, 105, 106, and 107. The network 103 is a medium configured to provide communication links between the terminal devices 101 and 102 and the servers 104, 105, 106, and 107. The network 103 can include a variety of connection types, such as wired communication links, wireless communication links, or fiber optic cables, and so on.

A user 110 can use the terminal devices 101, 102 to interact with the servers 104, 105, 106 and 107 via the network 103 to access various services, such as browsing the web, downloading data, and the like.

The terminal devices 101, 102 can be all kinds of electronic devices, including but not limited to personal computers, smart phones, smart TVs, tablet computers, personal digital assistants, e-book readers and so on.

The servers 104, 105, 106, 107 can be servers that provide a variety of services. A server can provide services in response to a service request of the user. It is understood that, one server can provide one or more services, and the same service can be provided by multiple servers.

It should be appreciated that, the number of the terminal devices, networks, and servers in FIG. 1 is only exemplary. It can be equipped with any number of terminal devices, networks and servers, depending on implementations.

As mentioned in the background, there is a problem that the solution for identifying a main picture of a web page in the related art cannot accurately express a topic of the web page. In this way, not only a transmission efficiency of the advertisement web page information is reduced, but also the user is unable to visit the web page accurately and quickly and the user experience is poor.

In view of the above defects in the related art, embodiments of the present disclosure provide a solution for identifying a main picture of a web page: after picking out candidate main pictures according to page attributes, by cropping the original picture of the candidate main picture to obtain a picture composition which can highlight an information topic and identifying the picture composition having an information topic matching the topic of the web page as the main picture of the web page, not only the topic of the web page can be effectively highlighted, but also the transmission efficiency of web page information and user experience can be improved. In the following, the method embodiments of the present disclosure will be described with reference to accompanying drawings.

Figure 2:
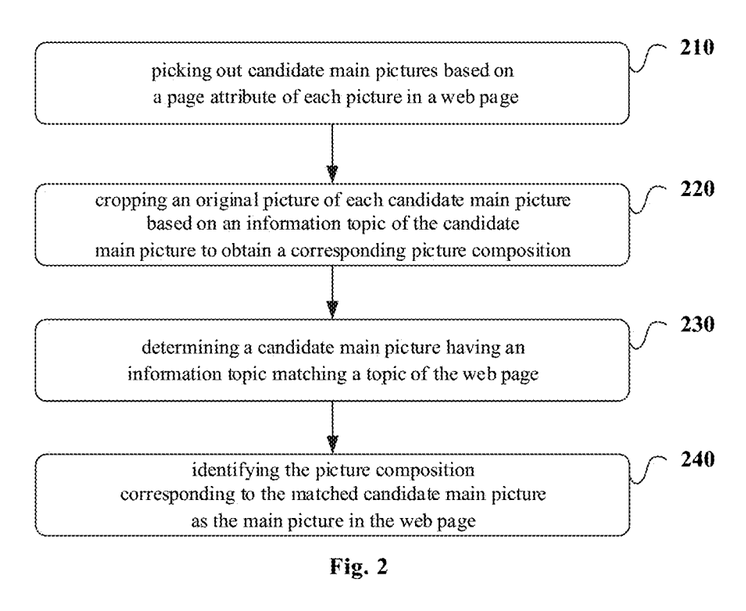
FIG. 2 is an exemplary flow chart illustrating a method for identifying a main picture of a web page according to an embodiment of the present disclosure.

FIG. 2 shows an exemplary flow chart of a method for identifying a main picture of a web page according to an embodiment of the present disclosure. The method shown in FIG. 2 can be executed on the terminal device or on the server in FIG. 1.

As shown in FIG. 2, in step 210, candidate main pictures are picked out based on a page attribute of each picture in a web page.

After analyzing a page structure of the web page, the inventor of the present disclosure finds that the most important picture which can best express the main picture of the web page is usually located at the front and special position in the web page. Compared with other pictures, the main picture has a larger area and a higher definition.

Thus, in embodiments of the present disclosure, the page information of the web page is acquired and all pictures contained in the web page are identified; a page attribute of each picture in the web page is obtained. The page attribute comprises at least one of the following: a page location, and a screen proportion.

Page location refers to a location of a picture in a web page; screen proportion refers to a ratio of an area of the picture to an area of the total screen of the web page. The position of the picture in the web page can be rendered by a browser, such that coordinate information of the picture in the web page can be calculated.

After obtaining the page attribute of each picture in the web page, candidate main pictures in the web page are picked out based on the page attribute. There may be one or more candidate main pictures picked out.

Specifically, pictures in the web page that meet any of the following conditions can be picked out as the candidate main pictures: a difference between the page position of the picture and a preset center position being less than a first threshold; the screen proportion of the picture exceeding a second threshold. The first threshold and the second threshold are empirical values set by those skilled in the art.

Alternatively, in order to improve an accuracy of identifying the main picture, the pictures that meet both of the above conditions can be taken as the candidate main pictures in the process of picking out the candidate main pictures, while the pictures that meet either of the conditions or do not meet the above two conditions are regarded as non-candidate main pictures.

Optionally, the page attribute can further include: a picture area, a picture definition, and so on.

In this way, the picture definition and the picture area can be used for preliminary filtering in the process of picking out the candidate main pictures, including: removing pictures each with a picture definition lower than a third threshold and a picture area smaller than a fourth threshold; then, comparing the page location of each filtered picture with the preset center position, and calculating the screen proportion of the filtered picture; and picking out the candidate main pictures based on the page location and the screen proportion. The third threshold and fourth threshold can be set by those skilled in the art according to their experiences.

Next, in step 220, an original picture of each candidate main picture is cropped based on an information topic of the candidate main picture to obtain a corresponding picture composition.

In embodiments of the present disclosure, the original picture corresponding to each candidate main picture picked out in step 210 is acquired first; then, the information topic of the candidate main picture is identified by using a first model tool based on deep learning; and the original picture of the candidate main picture is cropped to obtain the picture composition highlighting the information topic by using the first model tool.

Wherein, the first model tool is a pre-trained machine learning model based on deep learning. For example, sample pictures are collected in advance, information topics of the sample pictures are determined manually, and the picture compositions highlighting the information topics in the sample pictures are cropped. Then, a machine learning model is used to learn a corresponding relationship between the sample pictures and the information topics, a corresponding relationship between the information topics and the picture compositions, and a corresponding relationship between the sample pictures and the picture compositions to obtain the first model tool. In practical applications, the training of the first model tool can also be performed by adopting other techniques commonly used in the art, which are not detailed here.

Next, in step 230, a candidate main picture having an information topic matching a topic of the web page is determined.

In order to pick out the main picture that highlights the topic of the web page, it is necessary to compare the information topic of each candidate main picture with the topic of the web page to determine the candidate main picture that matches the topic of the web page.

The information topic of the candidate main picture can be extracted by using a picture topic extraction technology commonly used by those skilled in the art; alternatively, the information topic of the candidate main picture identified by the first model tool can be directly acquired.

In practical applications, advertisers will usually configure web pages with bidding words that are generally focused on a single topic. Thus, the topic of the web page can be determined according to the bidding words that the user has configured for the web page in advance.

Finally, in step 240, the picture composition corresponding to the matched candidate main picture is identified as the main picture in the web page.

Further, embodiments of the present disclosure may be applied to generate a search result. For example, after the user enters a search term, the search term entered by the user can be used as the query topic; upon receiving the query topic, the main picture having the information topic matching the query topic can be searched; then, the matched main picture is displayed as the search result.

From the above description, in some embodiments of the present disclosure, aiming at the problem that the topic of the web page is not prominent in the related art, a solution for cropping the candidate main picture based on the information topic of the candidate main picture is proposed. In this way, a reasonable composition highlighting the topic of the candidate main picture can be obtained, and then after matching the topic of the web page, the main picture that highlights the topic of the web page effectively can be obtained, such that the transmission efficiency of web page information and user experience can be improved. Moreover, in practical applications, if the identified main picture of the web page can be promoted and displayed, it will greatly increase the click rate of promotion.

It should be noted that, although operations of the method of the present disclosure are described in a particular order in the accompanying drawings, it is not required or implied that these operations must be performed in that particular order or that all of the operations shown must be performed to achieve the desired result. In contrast, the order of the steps depicted in the flow chart can be changed partly. For example, after executing step 210, step 230 can be executed firstly to determine the candidate main picture having the information topic matching the topic of the web page, then, step 220 is executed to crop the original picture of the candidate main picture matching the topic of the web page based on the information topic of the candidate main picture to obtain the corresponding picture composition, and thereafter, step 240 is executed to identify the corresponding picture composition of the matched candidate main picture as the main picture of the web page.

Figure 3:
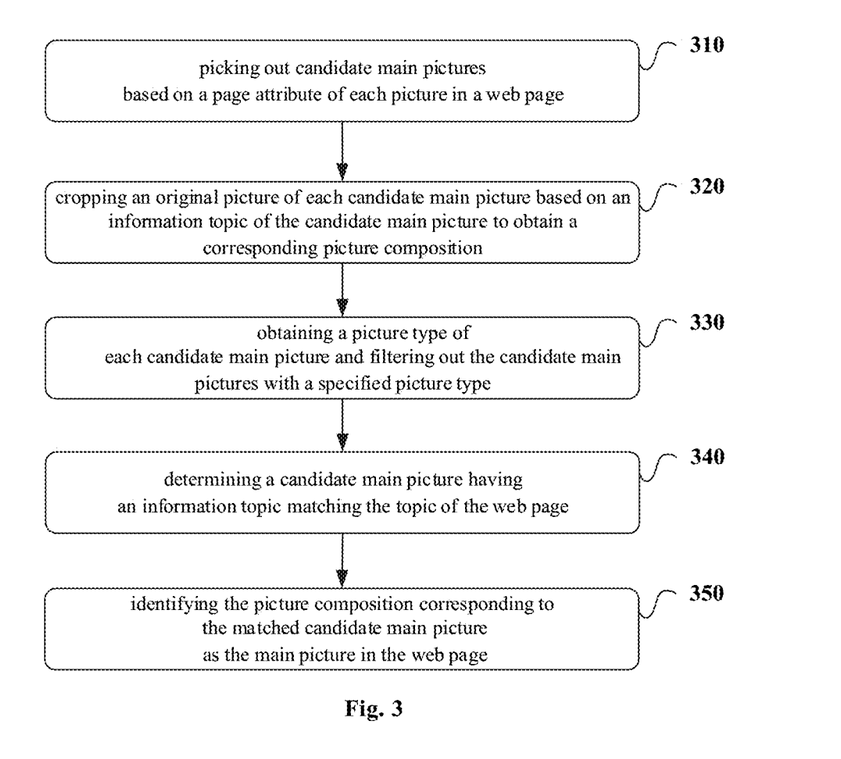
FIG. 3 is an exemplary flow chart illustrating a method for identifying a main picture of a web page according to another embodiment of the present disclosure.

FIG. 3 shows an exemplary flow chart of a method for identifying a main picture of a web page according to another embodiment of the present disclosure. The method shown in FIG. 3 can be executed on the terminal device or the server in FIG. 1.

As shown in FIG. 3, in step 310, candidate main pictures are picked out based on a page attribute of each picture in a web page.

Step 310 is similar to step 210 and will not be repeated here.

In step 320, an original picture of each candidate main picture is cropped based on an information topic of the candidate main picture to obtain a corresponding picture composition.

Step 320 is similar to step 220 and will not be repeated here.

In step 330, a picture type of each candidate main picture is obtained and the candidate main pictures with a specified picture type are filtered out.

In the embodiment shown in FIG. 3, for filtering out some low-quality pictures, a second model tool based on deep learning is used to classify the original pictures of the candidate main pictures and determine the picture types of the candidate main pictures. Then, the candidate main pictures picked out in step 210 are filtered based on preset filtering conditions. For example, the candidate main pictures with a specified picture type are filtered out. The specified picture type includes at least one of the following: a texture type, and a QR code type. In practical applications, the specified picture type to be filtered out can be set according to actual needs.

The second model tool is a pre-trained classification model based on deep learning. For example, sample pictures can be collected in advance and type descriptions of the sample pictures can be determined manually. Then, the collected sample pictures and the corresponding type descriptions are taken as training samples for training a classification model so as to obtain the second model tool. In practical applications, the training of the second model tool can also be performed by adopting other techniques commonly used in the art, which are not detailed here.

And then, in step 340, a candidate main picture having an information topic matching a topic of the web page is determined.

Finally, in step 350, the picture composition corresponding to the matched candidate main picture is identified as the main picture in the web page.

Further, the search term entered by the user can be used as the query topic; upon receiving the query topic, the main picture having the information topic matching the query topic is searched; then, the matched main picture is displayed as the search result.

From the above description, in some embodiments of the present disclosure, aiming at the problem that the topic of the web page is not prominent in the related art, a solution is proposed to crop the candidate main picture according to the information topic of the candidate main picture. In this way, a reasonable composition highlighting the topic of the candidate main picture can be obtained, and then after matching the topic of the web page, the main picture that highlights the topic of the web page effectively can be obtained, such that the transmission efficiency of web page information and user experience can be improved.

In addition, the embodiment in FIG. 3, compared with the embodiment in FIG. 2, includes a solution of filtering the candidate main pictures based on the picture types, which can filter out low-quality pictures, thus ensuring the high quality requirement of determining the main picture of the web page and improving user experience.

It should be noted that, although the operations of the method of the present disclosure are described in a particular order in the accompanying drawings, it is not required or implied that these operations must be performed in that particular order or that all of the operations shown must be performed to achieve the desired result. In contrast, the order of the steps depicted in the flow chart can be changed partly. For example, step 320 and step 330 in embodiment 3 may be performed in another order or simultaneously. Alternatively or additionally, certain steps can be omitted, multiple steps can be combined into one step, and/or a step can be decomposed into multiple steps.

Figure 4:
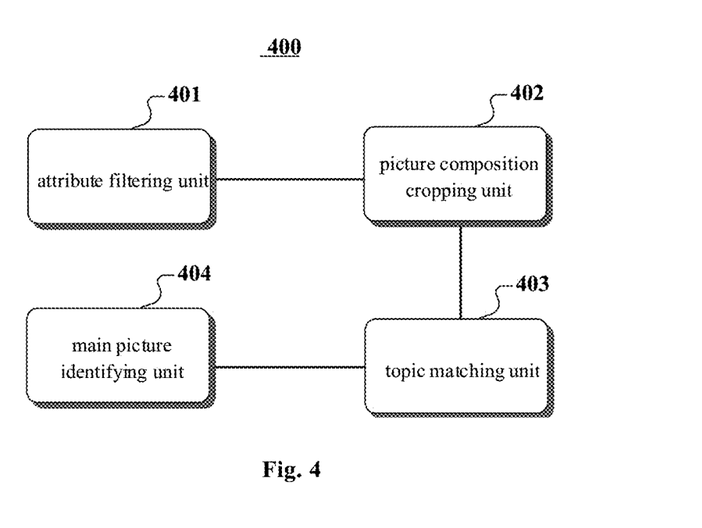
FIG. 4 is an exemplary block diagram illustrating a device for identifying a main picture of a web page according to an embodiment of the present disclosure.

Further referring to FIG. 4, FIG. 4 shows an exemplary block diagram illustrating a device for identifying a main picture of a web page 400 according to an embodiment of the present disclosure.

As shown in FIG. 4, the device for identifying a main picture of a web page 400 may include: an attribute filtering unit 401, a picture composition cropping unit 402, a topic matching unit 403, a main picture identifying unit 404.

The attribute filtering unit 401 is configured to pick out candidate main pictures based on a page attribute of each picture in a web page.

The page attribute comprises at least one of the following: a page location, and a screen proportion.

Specifically, the attribute filtering unit 401 is configured to pick out pictures in the web page that meet any of the following conditions as the candidate main pictures: a difference between the page position of the picture and a preset center position being less than a first threshold; the screen proportion of the picture exceeding a second threshold.

The picture composition cropping unit 402 is configured to crop an original picture of each candidate main picture based on an information topic of the candidate main picture to obtain a corresponding picture composition.

Specifically, the picture composition cropping unit 402 is configured to identify the information topic of the candidate main picture by using a first model tool based on deep learning; and crop the original picture of the candidate main picture by using the first model tool based on deep learning to obtain the picture composition highlighting the information topic.

The topic matching unit 403 is configured to determine a candidate main picture having an information topic matching the topic of the web page.

The topic of the web page is determined according to bidding words configured by users for the web page.

The main picture identifying unit 404 is configured to identify a picture composition corresponding to the matched candidate main picture as the main picture of the web page.

Optionally, the device for identifying a main picture of a web page 400 may also include: a main picture displaying unit.

The main picture displaying unit is configured to, upon receiving a query topic, inquire the main picture having the information topic matching the query topic and display the matched main picture.

It should be appreciated that, the units recorded in the device for identifying a main picture of a web page 400 correspond to the steps in the method described in FIG. 2.

Thus, the operations and characteristics described above for the method are also applicable to the device for identifying a main picture of a web page 400 and the units contained therein, which are not described here.

Figure 5:
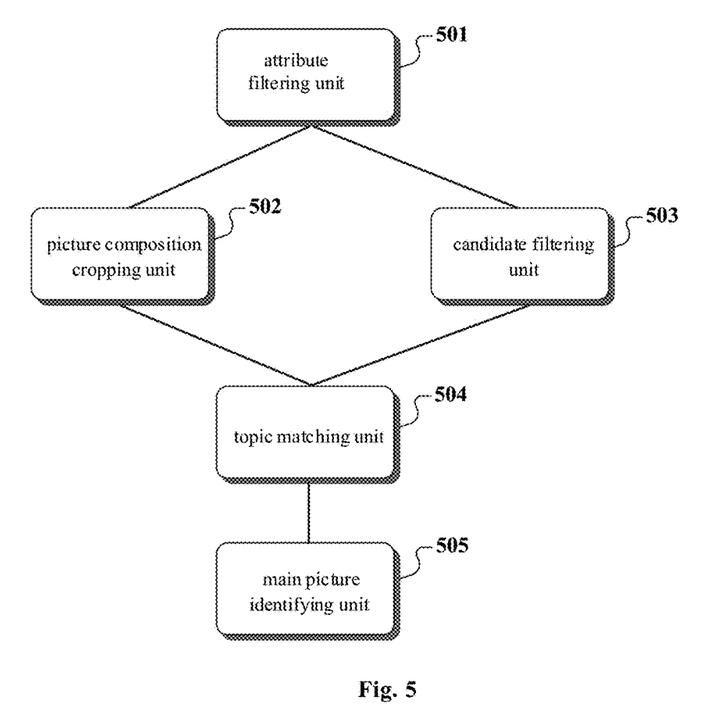
FIG. 5 is an exemplary block diagram illustrating a device for identifying a main picture of a web page according to another embodiment of the present disclosure.

Further referring to FIG. 5, FIG. 5 shows an exemplary block diagram illustrating a device for identifying a main picture of a web page 500 according to another embodiment of the present disclosure.

As shown in FIG. 5, the device for identifying a main picture of a web page 500 may include: an attribute filtering unit 501, a picture composition cropping unit 502, a candidate filtering unit 503, a topic matching unit 504, and a main picture identifying unit 505.

The attribute filtering unit 501 is configured to pick out the candidate main pictures based on a page attribute of each picture in a web page. The page attribute comprises at least one of the following: a page location, and a screen proportion.

Specifically, the attribute filtering unit 501 is configured to pick out pictures in the web page that meet any of the following conditions as the candidate main pictures: a difference between the page position of the picture and a preset center position being less than a first threshold; the screen proportion of the picture exceeding a second threshold.

The picture composition cropping unit 502 is configured to crop an original picture of each candidate main picture based on an information topic of the candidate main picture to obtain a corresponding picture composition.

Specifically, the picture composition cropping unit 502 is configured to identify the information topic of the candidate main picture by using a first model tool based on deep learning; and crop the original picture of the candidate main picture by using the first model tool based on deep learning to obtain the picture composition highlighting the information topic.

The candidate filtering unit 503 is configured to obtain a picture type of each candidate main picture, and filter out the candidate main pictures with a specified picture type. The specified picture type includes at least one of the following: a texture type, and a QR code type.

Specifically, the candidate filtering unit 503 is configured to classify the original picture of the candidate main picture and determine the picture type of the candidate main picture by using a second model tool based on deep learning.

The topic matching unit 504 is configured to determine a candidate main picture having an information topic matching the topic of the web page. The topic of the web page is determined according to bidding words configured by users for the web page.

The main picture identifying unit 505 is configured to identify a picture composition corresponding to the matched candidate main picture as the main picture of the web page.

Optionally, the device for identifying a main picture of a web page 500 may also include: a main picture displaying unit.

The main picture displaying unit is configured to, upon receiving a query topic, inquire the main picture having the information topic matching the query topic; and display the matched main picture.

It should be appreciated that, the units recorded in the device for identifying a main picture of a web page 500 correspond to the steps in the method described in FIG. 3. Thus, the operations and characteristics described above for the method are also applicable to the device for identifying a main picture of the web page 500 and the units contained therein, which are not described here.

Further, embodiments of the present disclosure further provide a computing device, includes one or more processors and a memory, the memory is configured to store computer instructions that, when executed by a processor, cause the processor to implement the method for identifying a main picture of a web page provided by embodiments of the present disclosure.

Figure 6:
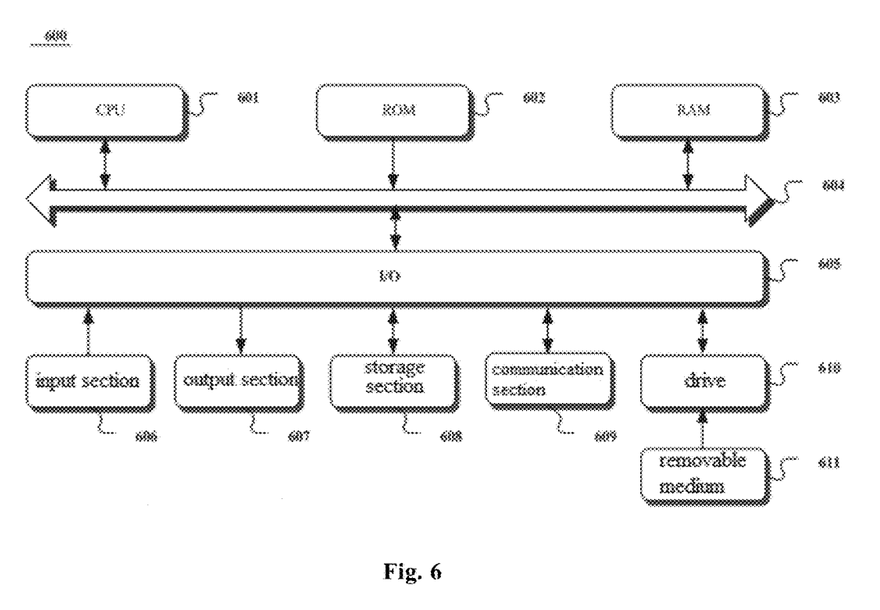
FIG. 6 is a structure diagram illustrating a computer system suitable for realizing embodiments of the present disclosure.

FIG. 6 shows a structure diagram illustrating a computer device 600 suitable for realizing embodiments of the present disclosure.

As shown in FIG. 6, a computer system 600 includes a central processing unit (CPU) 601, it may perform various appropriate actions and processes according to programs stored in a read-only memory (ROM) 602 or loaded from a storage section 608 into a random-access memory (RAM) 603. In the RAM 603, various programs and data required for operations of the system 600 are also stored. The CPU 601, the ROM 602 and the RAM 603 are connected to each other through a bus 604. An input/output (I/O) interface 605 is also connected to the bus 604.

The following parts are connected to the I/O interface 605: an input section 606 including a keyboard, a mouse and the like; an output section 607 including such as a cathode ray tube (CRT), a liquid crystal display (LCD), and a loudspeaker and the like; a storage section 608 that includes a hard disk and the like; and a communication section 609 including a network interface card such as a LAN card, a modem and the like. The communication section 609 performs communication processing over a network such as the Internet. A drive 610 is also connected to the I/O interface 605 as needed. A removable medium 611, such as a disk, an optical disc, a magneto-optical disk, a semiconductor memory and the like, is installed on the drive 610 as required so that computer programs read from it are installed into the storage section 608 as required.

In particular, according to embodiments of the present disclosure, the process described in FIGS. 2 to 3 above can be implemented as a computer software program. For example, an embodiment of the present disclosure includes a computer program product comprising a computer program physically contained on a machine readable medium, and the computer program includes program codes for executing methods as shown in FIGS. 2 to 3. In such an embodiment, the computer program may be downloaded and installed from the network through the communication section 609, and/or installed from the removable medium 611.

The flow charts and block diagrams in the accompanying drawings illustrate the architecture, functions and operations that may be realized according to the systems, methods and computer program products of embodiments of the present disclosure. At this point, each box in a flow chart or block diagram can represent a module or unit, a program segment, or a piece of code, the module or unit, the program segment, a piece of code contains one or more executable instructions for implementing a specified logical function. It should also be noted that in some alternate implementations, the functions marked in the box may also occur in a different order from those marked in the accompanying drawings. For example, two successive boxes can actually execute in essentially parallel, or they can sometimes execute in reverse order, depending on the function involved. It should also be noted that, each box in the block diagram and/or flow chart, and the combination of the boxes in the block diagram and/or flow chart, may be implemented with a dedicated hardware-based system performing specified functions or operations, or with a combination of dedicated hardware and computer instructions.

The units or modules described in embodiments in the present disclosure can be implemented by means of software or hardware. The units or modules can also be set in a processor. The names of these units or modules in some cases do not constitute a limit to the units or modules themselves.

On another aspect, the present disclosure also provides a computer readable storage medium in which computer programs are stored, the computer readable storage medium may be a computer readable storage medium contained in the computing device in the embodiments; it may also be a computer readable storage medium that exists alone and is not mounted into the device. The computer readable storage medium is configured to store one or more programs that, when executed by one or more processors, implement a formula input method described in the present disclosure.

The above description is only an explanation of preferred embodiments of the present disclosure and the applied technical principles. It should be appreciated to those skilled in the art that, the scope of the present disclosure is not limited to the technical solution resulting from the specific combination of the above technical characteristics, it shall also cover other technical solutions formed by any combination of the above technical characteristics or their equivalent characteristics without disconnecting from the conception of the present disclosure. For example, a technical solution is formed by substituting (but not limited to) the above features with the technical features with similar functions disclosed in the present disclosure.

What is claimed is:

1. A method for identifying a main picture in a web page, comprising:
    identifying all pictures in the web page;
    obtaining a page attribute of each picture in the web page;
    picking out candidate main pictures from the all pictures in the web page based on the page attribute of each picture in the web page;
    acquiring an original picture corresponding to each candidate main picture picked out,
    identifying an information topic of the candidate main picture by using a first model tool based on deep learning;
    cropping the original picture of each candidate main picture based on the information topic of the candidate main picture to obtain a picture composition highlighting the information topic by using the first model tool;
    determining a candidate main picture having an information topic matching a topic of the web page by comparing the information topic of each candidate main picture with the topic of the web page, in which the topic of the web page is determined based on bidding words configured by a user for the web page; and
    identifying a picture composition corresponding to the matched candidate main picture as the main picture in the web page.

2. The method according to claim 1, wherein the page attribute comprises at least one of a page location representing a location of a picture in the web page and a screen proportion representing a ratio of an area of the picture to an area of a total screen of the web page.

3. The method according to claim 2, wherein the step of picking out the candidate main pictures from the all pictures in the web page based on the page attribute of each picture in the web page comprises: picking out pictures in the web page that meet any of following conditions as the candidate main pictures:
  a difference between the page position of the picture and a preset center position being less than a first threshold;
  the screen proportion of the picture exceeding a second threshold.

4. The method according to claim 1, after the step of picking out the candidate main pictures, further comprising:
  obtaining a picture type of each candidate main picture; and
  filtering out the candidate main pictures with a specified picture type, wherein, the specified picture type includes at least one of a texture type and a QR code type.

5. The method according to claim 4, wherein, the step of obtaining the picture type of each candidate main picture, comprises:
  classifying the original picture of the candidate main picture and determining the picture type of the candidate main picture by using a second model tool based on deep learning.

6. The method according to claim 1, further comprising:
  upon receiving a query topic, inquiring the main picture having the information topic matching the query topic; and
  displaying the matched main picture.

7. A computing device, comprises one or more processors and a memory, wherein
  the memory is configured to store computer instructions that, when executed by a processor, cause the processor to implement a method comprising:
  identifying all pictures in the web page;
  obtaining a page attribute of each picture in the web page;
  picking out candidate main pictures from the all pictures in the web page based on the page attribute of each picture in the web page;
  acquiring an original picture corresponding to each candidate main picture picked out,
  identifying an information topic of the candidate main picture by using a first model tool based on deep learning;
  cropping the original picture of each candidate main picture based on the information topic of the candidate main picture to obtain a picture composition highlighting the information topic by using the first model tool;
  determining a candidate main picture having an information topic matching a topic of the web page by comparing the information topic of each candidate main picture with the topic of the web page, in which the topic of the web page is determined based on bidding words configured by a user for the web page; and
  identifying a picture composition corresponding to the matched candidate main picture as the main picture in the web page.

8. The computing device according to claim 7, wherein the page attribute comprises at least one of a page location representing a location of a picture in the web page and a screen proportion representing a ratio of an area of the picture to an area of a total screen of the web page.

9. The computing device according to claim 8, wherein the step of picking out the candidate main pictures from the all pictures in the web page based on the page attribute of each picture in the web page comprises: picking out pictures in the web page that meet any of following conditions as the candidate main pictures:
  a difference between a page position of the picture and a preset center position being less than a first threshold;
  a screen proportion of the picture exceeding a second threshold.

10. The computing device according to claim 7, after the step of picking out the candidate main pictures, further comprising:
  obtaining a picture type of each candidate main picture; and
  filtering out the candidate main pictures with a specified picture type, wherein, the specified picture type includes at least one of a texture type and a QR code type.

11. The computing device according to claim 10, wherein, the step of obtaining the picture type of each candidate main picture, comprises:
  classifying the original picture of the candidate main picture and determining the picture type of the candidate main picture by using a second model tool based on deep learning.

12. The computing device according to claim 7, further comprising:
  upon receiving a query topic, inquiring the main picture having the information topic matching the query topic; and
  displaying the matched main picture.

13. A non-transient computer-readable storage medium, having a plurality of instructions stored therein, wherein the plurality of instructions are adapt to be loaded by a processor to perform a method comprising:
  identifying all pictures in the web page;
  obtaining a page attribute of each picture in the web page;
  picking out candidate main pictures from the all pictures in the web page based on the page attribute of each picture in the web page;
  acquiring an original picture corresponding to each candidate main picture picked out,
  identifying an information topic of the candidate main picture by using a first model tool based on deep learning;
  cropping the original picture of each candidate main picture based on the information topic of the candidate main picture to obtain a picture composition highlighting the information topic by using the first model tool;
  determining a candidate main picture having an information topic matching a topic of the web page by comparing the information topic of each candidate main picture with the topic of the web page, in which the topic of the web page is determined based on bidding words configured by a user for the web page; and
  identifying a picture composition corresponding to the matched candidate main picture as the main picture in the web page.

* * * * *